No. 812,456.  
PATENTED FEB. 13, 1906.
H. B. ROHDE.  
TEA KETTLE.  
APPLICATION FILED SEPT. 23, 1904.
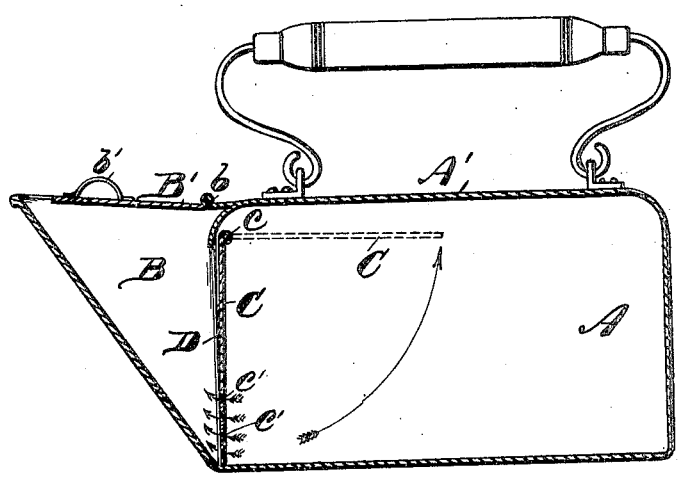
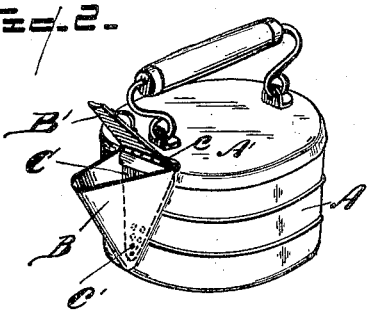
Witnesses:  
Allan McLerie,  
Tessie Quinlan.
Inventor  
Harry B. Rohde  
By his Attorneys Fisk and Thomas

UNITED STATES PATENT OFFICE.

HARRY B. ROHDE, OF DETROIT, MICHIGAN, ASSIGNOR OF ONE-HALF TO CHARLES A. GLEASON, OF DETROIT, MICHIGAN.

TEA-KETTLE.

No. 812,456.      Specification of Letters Patent.      Patented Feb. 13, 1906.

Application filed September 23, 1904. Serial No. 225,555.

*To all whom it may concern:*

Be it known that I, HARRY B. ROHDE, a citizen of the United States, residing at Detroit, county of Wayne, State of Michigan, have invented a certain new and useful Improvement in Tea-Kettles; and I declare the following to be a full, clear, and exact description of the invention, such as will enable others skilled in the art to which it pertains to make and use the same, reference being had to the accompanying drawings, which form a part of this specification.

My invention relates to an improvement in tea-kettles, shown in the accompanying drawings, and more particularly set forth in the following specification and claim.

In the drawings, Figure 1 is a central vertical section through the kettle. Fig. 2 is a perspective view of the same.

The object of my invention is to construct a kettle which will dispense with the usual cover by removing which the kettle is filled. It is well known that the cover of the kettle is often forced off by the pressure of steam, and when the kettle is old or has been used for a long time the cover often becomes so loose as to be easily displaced, which frequently results in badly scalded or burned hands due to the sudden escape of steam. By my invention accidents of this kind are avoided, while at the same time means are provided whereby plates or other small articles may be kept warm by placing them on the top of the kettle at the point usually occupied by the cover. It will also be seen by further reference to the specification and drawings that the kettle can be as easily filled or cleaned as the old kind, with the added advantages before referred to and others which will hereinafter appear.

Referring to the letters of reference shown in the drawings, A is the body of the kettle.

A' is the top, which is integral with the body of the kettle and having the usual lips for engaging the bail.

B is a spout provided with a cover B', hinged at $b$.

$b'$ is a ring or convenient handle by which the cover may be raised.

C is a swinging plate or flap-valve hinged at $c$ inside of the body of the kettle and provided with perforations $c'$ for passage of water at its lower end and when in the position shown in the drawings serves to prevent any sudden rush of water through the spout when the kettle is tipped for pouring the water which is discharged through the orifices $c'$. In dotted lines in Fig. 1 I show the swinging plate C raised, by which means easy access is obtained into the body of the kettle for the purpose of removing scale or any other foreign matter that may have obtained entrance. As will be readily understood, the kettle is filled with water by raising the cover B', as shown in Fig. 2, the water being poured in by way of the spout. In pouring water from the kettle the weight of the water closes the swinging plate C against the shoulder D, forcing water to pass out through the orifices in the bottom of the plate.

Having thus described my invention, what I claim is—

In a tea-kettle, a body portion having a flat imperforate top adapted for the reception of a plate or other article to be warmed, a spout projecting from the side wall of the body portion and beyond the line of the bail or handle, said spout having an opening into the body portion from top to bottom, and a depending flap hinged to the wall of the kettle at the top and provided with perforations near the bottom only of the flap for the discharge of water through the spout, substantially as described.

In testimony whereof I sign this specification in the presence of two witnesses.

HARRY B. ROHDE.

Witnesses:
     S. E. THOMAS,
     CHAS. GLEASON.